(12) United States Patent
Borchers et al.

(10) Patent No.: US 7,865,341 B2
(45) Date of Patent: Jan. 4, 2011

(54) COMPUTER-ASSISTED MODELLING METHOD FOR THE BEHAVIOR OF A STEEL VOLUME HAVING A VOLUMETRIC SURFACE

(75) Inventors: Wolfgang Borchers, Erlangen (DE); Klaus Franz, Nürnberg (DE); Klaus Weinzierl, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 916 days.

(21) Appl. No.: 10/588,353

(22) PCT Filed: Dec. 27, 2004

(86) PCT No.: PCT/EP2004/053709
§ 371 (c)(1),
(2), (4) Date: May 2, 2007

(87) PCT Pub. No.: WO2005/076092
PCT Pub. Date: Aug. 18, 2005

(65) Prior Publication Data
US 2007/0276638 A1    Nov. 29, 2007

(30) Foreign Application Priority Data
Feb. 6, 2004    (DE) .................. 10 2004 005 919

(51) Int. Cl.
*G06F 17/10* (2006.01)
(52) U.S. Cl. ............................................. 703/6; 703/2
(58) Field of Classification Search ............ 703/2, 703/6; 700/95, 96, 109, 117, 145, 153; 148/121; 266/96, 99; 164/452

See application file for complete search history.

(56) References Cited

U.S. PATENT DOCUMENTS 6,860,950 B2    3/2005    Franz et al.

FOREIGN PATENT DOCUMENTS

| DE | 199 63 185 A1 | 7/2001 |
| DE | 101 29 565 A1 | 1/2003 |
| EP | 0 997 203 A1 | 5/2000 |
| JP | 58199613 A | 11/1983 |

(Continued)

OTHER PUBLICATIONS

O.P. Bruno et al., Free Boundary Conditions at Austenite-Martensite Interfaces, Jan. 30, 1995, THe American Physical Society, vol. 74, No. 5, pp. 746-749.*

(Continued)

*Primary Examiner*—Paul L Rodriguez
*Assistant Examiner*—Luke Osborne

(57) ABSTRACT

A computer determines a subsequent state of a steel volume, based on an instantaneous initial state of said steel volume and at least one volumetric surface, the temporary influence quantities acting on said steel volume, by resolution of an equation of thermal condition and phase change. The states include for at least one volumetric element of the steel volume, a local distribution in concentration of a alloy element mobile in the steel, the local proportions of the modeled phases of the steel and a quantity describing a local energy content of the steel. The phases include austenite and another phase, generally, ferrite or cementite. In the context of the change equation, the concentration levels of the mobile alloy element, which are located on either side of the phase boundary, between the austenite and the other phase are determined by resolution of a Stephan problem.

18 Claims, 10 Drawing Sheets

FOREIGN PATENT DOCUMENTS

JP    02258914 A    10/1990

OTHER PUBLICATIONS

G. N. Vlasichev, A method of numerical solution of one-dimensional stefan problems of two types, Sep. 1, 1993, Journal of Engineering Physics and Thermophysics, vol. 65, Issue 3, pp. 896-902.*

A. Visintin; "Mathematical Models of Solid-Solid Phase Transitions in Steel"; IMA Journal of Applied Mathematics; 1987; pp. 143-157; vol. 39; XP008009060; Oxford University Press.

Example book of the software, "DICTRA Examples, Thermo-Calc AB", Stockholm, Sweden, version 21, 2001, pp. 23 to 63.

User manual of the software DICTRA ("user, guide,") the company Thermo-Calc, Stockholm, Schwerden, version 21, 2001, pp. 1-78.

Helander-Editor, "Newsletter, Firma Thermo-Calc Software", No. 25, Mar. 2002, pp. 1-12, online http://www.thermocalc.com/Filer/Pdf/Newsletters/Newsletter-25.pdf; Stockholm, Sweden.

Greven et al., "Macroscopic Modeling of The Microstructural Evolution in Castins Using Thermodynamic Formulated Phase Diagrams", 1998; pp. 187-194, Modelling of Castings, Welding and Advanced Soldification Processes VIII, The Minerals, Metals & Materials Society.

Borgenstam et al., "DICTRA, A Tool For Simulation of Diffusional Transformations in Alloys", Journal of Phase Equilibria, vol. 21, No. 3, 2000, pp. 269-274.

Andersson et al., "Thermo-Calc & DICTRA, Computational Tools for Material Science", vol. 26, No. 2, 2002, pp. 273-312, Elsevier Science Ltd.

Inden et al., "Interfacial Conditions At The Moving Interface During Growth Of Ferrite From Austenite In Fe-C-(X) Alloys", Materials Science & Technology Nov. 9-12, 2003, pp. 65-79, Conference Proceedings, Chicago, Illinois, ISSN: 1546-2498.

Grafe, "Eidesstattliche Erklärung", regarding the program DICTRA, pp. 61-63, 2008.

Höglund, "Computer Simulation Of Diffusion Controlled Transformations in Multicomponent Alloys", Royal Institute of Technology, Stockholm, Schweden, 1997, pp. 1-17.

Crusius et al., "On the Numerical Treatment of Moving Boundary Problems", Z. Metallkunde 83, 1992. pp. 673-678.

Thermo-Calc Software, "Thermo-Calc Software History", online http://www.thermocalc.com/Company/History.html, Feb. 2, 2009,The Royal Institute of Technology, Stockholm, Sweden, 1 page.

* cited by examiner

FIG 6

$$ZA \rightarrow \boxed{\begin{array}{l} \dfrac{\partial H}{\partial t} - \text{div}\left[\dfrac{\lambda H(p1, p2, p3)}{\rho} \cdot \text{grad} T(H, p1, p2, p3)\right] = 0 \\[1em] \dfrac{\partial p1}{\partial t} = f1(T, K); \quad \dfrac{\partial p2}{\partial t} = f2(T, K); \quad \dfrac{\partial p3}{\partial t} = f3(T, K); \end{array}} \rightarrow ZF$$

FIG 7

$$ZA \rightarrow \boxed{\begin{array}{l} \dfrac{\partial H}{\partial t} - \dfrac{\partial}{\partial x}\left[\dfrac{\lambda H(p1, p2, p3)}{\rho} \cdot \dfrac{\partial}{\partial x} T(H, p1, p2, p3)\right] = 0 \\[1em] \dfrac{\partial p1}{\partial t} = f1(T, K); \quad \dfrac{\partial p2}{\partial t} = f2(T, K); \quad \dfrac{\partial p3}{\partial t} = f3(T, K); \end{array}} \rightarrow ZF$$

US 7,865,341 B2

COMPUTER-ASSISTED MODELLING METHOD FOR THE BEHAVIOR OF A STEEL VOLUME HAVING A VOLUMETRIC SURFACE

CROSS REFERENCE TO RELATED APPLICATIONS

This application is the US National Stage of International Application No. PCT/EP2004/053709, filed Dec. 27, 2004 and claims the benefit thereof. The International Application claims the benefits of German Patent application No. 10 2004 005 919.5 filed Feb. 6, 2004. All of the applications are incorporated by reference herein in their entirety.

FIELD OF THE INVENTION

The present invention relates to a computer-assisted modelling method for the behavior of a steel volume having a volumetric surface, in which a computer, based on an instantaneous initial state of the steel volume and at least one instantaneous influence quantity operating via the volumetric surface on the steel volume, by resolving an equation of thermal conduction and a phase change equation, determines a subsequent state of the steel volume, in which the at least one influence quantity comprises at least one local influence in each case for a number of surface elements of the volumetric surface and the local influences operate via the relevant surface element on the steel volume, in which the initial state and the subsequent state for a number of volume elements of the steel volume each comprise local elements of modelled phases of the steel and a quantity describing the local energy content of the steel, in which the modelled phases of the steel comprise austenite and a first further phase into which a austenite can be changed and which can be changed into austenite.

BACKGROUND OF THE INVENTION

This type of modelling method is known for example from DE-A-101 29 565. In this publication in particular an attempt was made for the first time to resolve the Fourier thermal conductivity equation itself and not to resolve an incorrect variation of this thermal conductivity equation, in order to correctly describe the thermodynamic behavior of a steel band. This publication is thus included by reference it in the disclosed content of the present invention.

Such a modelling method is also described in the older German Patent Application 102 51 716.9 not published at the time of the present application. With this modelling method an attempt is made to model the phase conversion of the steel on the basis of the Gibbs free enthalpies of the steel. This publication too is thus included by reference to it in the disclosed content of the present invention.

This type of modelling method is also known from the paper "Numerische Simulation der Wärmeleitung in Stahlblechen—Mathematik hilft bei der Steuerung von Kühlstrecken" (numerical simulation of thermal conductivity in steel sheets—mathematics helps in the control of cooling lines) by W. Borchers et al., published in the University periodical of the Friedrich-Alexander University Erlangen-Nürnberg, Volume 102, Oct. 27, 2001 year.

Finally traditional approaches in accordance with the Scheilen rule, according to Johnson-Mehl-Avrami and Brimacombe, are known.

The exact modelling of the temperature curve of steel over time during cooling down, especially of steel bands, is decisive for the control of the required water or coolant amounts of a cooling line for steel. This is because the transformation of the steel which occurs during cooling down decisively influences the thermal behavior of the steel as it cools down. Major material properties of the steel are also influenced by the cooling down process. Since the cooling down does not occur in thermal equilibrium however, it is not possible to describe the transformation simply by suitable adaptation of the thermal capacity. Thus an exact modelling of the phase change of the steel is also required in order to enable the cooling line to be controlled correctly.

In practice the traditional approaches of the prior art do not operate without errors in all cases. In particular they exhibit a series of systematic disadvantages. First of all separate parameters must be set for each material. Interpolations between different materials are not possible or at least only possible to a restricted extent. Secondly only two phases are considered in the traditional method of the prior art. An expansion to more than two phases is not possible for system reasons. Thirdly the traditional prior art methods only deliver a good match between model and reality for a complete change of the metal observed. Fourthly the traditional prior art methods do not provided any information about the heat released during the phase change. The knowledge of the phase change heat is however an absolute necessity for a correct solution of the thermal conduction equation.

The methodologies according to DE-A-101 29 565 and the technical paper "Numerische Simulation . . . " already represent a significant advance by comparison with such methods, since they at least describe the thermal conduction completely correctly. The older German Patent Application additionally improves the modelling of the phase change. In particular it supplies the change heat which occurs during the phase change. However these methods are also not capable of improvement.

SUMMARY OF THE INVENTION

The object of the present invention is to create a modelling method for a metal which delivers better modelling results.

The object is achieved, by the initial state and the subsequent state for at least one of the volume elements also including a local concentration distribution of at least one mobile alloy element in the steel, within the context of the change equation it is determined for at least one volume element which concentrations of the at least one mobile alloy element are present on both sides of a first phase boundary between austenite and the first further phase, by resolving a first Stefan problem it is determined whether and how the concentration in distribution of the at least one mobile alloy element changes in the austenite zone of the volume element concerned and whether and by what proportion the first phase boundary is thereby displaced, and the local proportions of the phases are determined on the basis of a position of the first phase boundary specified by the extent of the shift of the first phase boundary.

The mobile alloy element in steel is as a rule carbon. As an alternative or in addition however it is also possible for the alloy element to be nitrogen. It can also be another alloy element which is preferably arranged in steel at intermediate grid locations.

This modelling method already allows a clear advance compared to the known prior art. This is because, with this process—depending on whether the further phase is ferrite or cementite—the change behavior of austenite into ferrite or austenite into cementite and vice versa can be modelled very realistically.

Preferably the modelled phases of the steel also comprise a second further phase into which austenite can be converted and which can be converted into austenite. This is because it is then especially possible, that, for the volume element considered, it is also determined within the context of the change equation which concentrations of the at least one mobile alloy element are present on both sides of a second phase boundary between austenite and the second further phase, through additionally resolving a second Stefan problem it is determined whether and how the concentration distribution of the at least one mobile alloy element changes in the austenitic zone of the volume element considered and whether and by what extent the second phase boundary is thereby displaced, the Stefan problems are coupled to each other, square measures are assigned to the phase boundaries, a proportion of the square measure assigned to the second phase boundary of the total of the square measures is determined and the local proportions of the phases also depend on the proportion of the square measure of the total of the square measures assigned to the second phase boundary.

With this method not only can the change between austenite on the one side and ferrite or cementite on the other be described very realistically, but especially also the change of austenite into perlite and vice versa. This means that total significant change behaviors of steel in the fixed state can be described correctly. Furthermore this procedure makes it possible to establish whether perlite is formed or not.

The proportion of the square measure of the total of the square measures assigned to the second phase boundary can be determined by the phase boundaries always remaining arranged next to each other. Alternatively it is however also possible to adjust this proportion such that the phase boundaries tend towards each other. On the basis of this proportion it can then also be deduced whether austenite only changes in the first further phase, only in the second further phase or both into the first and also into the second further phase.

In principle it is also possible to determine the embodiment of the first phase boundary three-dimensionally. However this demands a significant computing effort. Preferably the computation is thus undertaken one-dimensionally. This is possible more simply if the volume element is a space-filling Aristotle body, especially a cuboid It is also preferable, for the observed volume element to be embodied as a cuboid and to have three basic dimensions, for the first phase boundary to be embodied as a rectangle with a first longitudinal side and a first transverse side and for the first longitudinal side to correspond to the first of the basic dimensions, for the first transverse side to run in parallel to a second of the basic dimensions and for displacements of the first phase boundary to occur in parallel to the third of the basic dimensions.

If the second further phase is also taken into account then the following applies, that the second phase boundary is embodied as a rectangle with a second longitudinal side and a second transverse side and that the second longitudinal side corresponds to the first of the basic dimensions, the second transverse side runs in parallel to the second of the basic dimensions and displacements of the second phase boundary occur in parallel to the third of the basic dimensions.

If the sum of the transverse sides of the phase boundaries is approximately equal to 1.5 to 3 times a critical lamella spacing in which an energy balance which on the on hand takes account of the phase changes of the steel corresponding to the displacement of the phase boundaries and on the other hand takes account changes to the surface of a boundary layer between the first and the second further phase corresponding to the displacement of the phase boundaries, the grain spacing of the perlite can also be determined using the model. The lamella spacing (meaning the sum of the transverse sides of the phase boundaries) can in this case especially be approximately equal to double the critical lamella spacing.

Despite the only one-dimensional computation, the inventive modelling method delivers very realistic results if the proportion of austenite based on a non-linear function determines the position of the phase boundary or of the phase boundaries.

If the concentrations in which the at least one mobile alloy element are present on both sides of the first phase boundary or on both sides of the first and on both sides of the second phase boundary are determined on the basis of the Gibbs free enthalpies of the phases, the determination of the concentrations of the at least one mobile alloy element at the phase boundaries is especially simple.

It is possible to always resolve the coupled Stefan problems and to deduce from this which phases are formed in what volume. In many cases this is even irrefutable. Sometimes however it is possible, before resolving the phase change equation, on the basis of the phases already available in the initial state and on the basis of the Gibbs free enthalpies, to determine in advance, whether both austenite and also the first further phase are present or whether in addition to austenite and the first further phase: the second further phase is present.

In individual cases the number of volume elements can be small. In an extreme case they are equal to one. Usually however the steel volume comprises a plurality of volume elements. If the Stefan problem or the Stefan problems are only resolved for a part of the volume elements and the local proportions of the phases of the other volume elements are determined on the basis of the local proportions of the phases of the part of the volume element, the computing power required for modelling the behavior of the steel volume can thus be greatly reduced without having any great detrimental effect on the expressiveness of the model computation. The thermal conduction equation on the other hand is generally resolved individually for each volume element.

The modelling method can alternatively be executed online and in real time but also offline.

It is possible for example, for an initial status and at least one desired end quantity to be specified to the computer, for the above modelling method to be applied iteratively, for the initial state of the first iteration to correspond to the initial state and the initial state of each further iteration to correspond to the subsequent state determined immediately beforehand, and that, on the basis of the subsequent state determined after a last iteration an expected final quantity is determined and is compared with the desired final quantity.

In this case the inventive modelling method can be alternatively executed online and in real time or offline.

With offline execution in particular it is possible in this case that the influence quantities of the iteration correspond in their totality to a sequence of influence quantities, that the computer on the basis of the comparison of the expected end quantity with the desired end quantity varies the influence quantity sequence and starting from the initial status again, executes the above modelling method until at least the expected end quantity corresponds to the desired end quantity.

It is however also possible for the computer to determine the influence quantities on the basis of an initial quantity determined from the initial state and a desired subsequent quantity and to control an influence device such that the steel volume is influenced in accordance with the influence quantity determined. In this case the modelling method must be executed online and in real time. The influencing device can be controlled in this case alternatively immediately or in the subsequent iteration.

BRIEF DESCRIPTION OF THE DRAWINGS

Further advantages and details emerge from the subsequent description of an exemplary embodiment in conjunction with the drawings. The Figures show the following basic diagrams FIG. 1 a cooling line for a steel band,
FIG. 2 the steel band from FIG. 1 in detail,
FIG. 3 a volume element in a perspective diagram,
FIG. 4 a flowchart,
FIG. 5 a further flowchart,
FIG. 6 a thermal conduction equation and a phase change equation,
FIG. 7 a further thermal conduction equation and a phase change equation,
FIG. 8 a further flowchart,
FIG. 9 the Gibbs free enthalpies of the phases of this steel as a function of the proportion of carbon at a first temperature,
FIG. 10 the Gibbs free enthalpies as a function of the proportion of carbon of the steel at a second temperature,
FIG. 11 a volume element in a perspective diagram,
FIG. 12 the volume element of FIG. 11 viewed from the side,
FIG. 13 a volume element similar to that depicted in FIG. 12,
FIG. 14 a volume element in a perspective diagram,
FIG. 15 the volume element of FIG. 14 seen from above,
FIG. 16 the volume element of FIG. 15 shown in cross section along the line XVI-XVI of FIG. 15
FIG. 17 the volume element of FIG. 15 shown in cross section along the line XVII-XVII of FIG. 5,
FIG. 18 a further flowchart and
FIG. 19 a detail of FIG. 15.

DETAILED DESCRIPTION OF THE INVENTION

Figure 1:
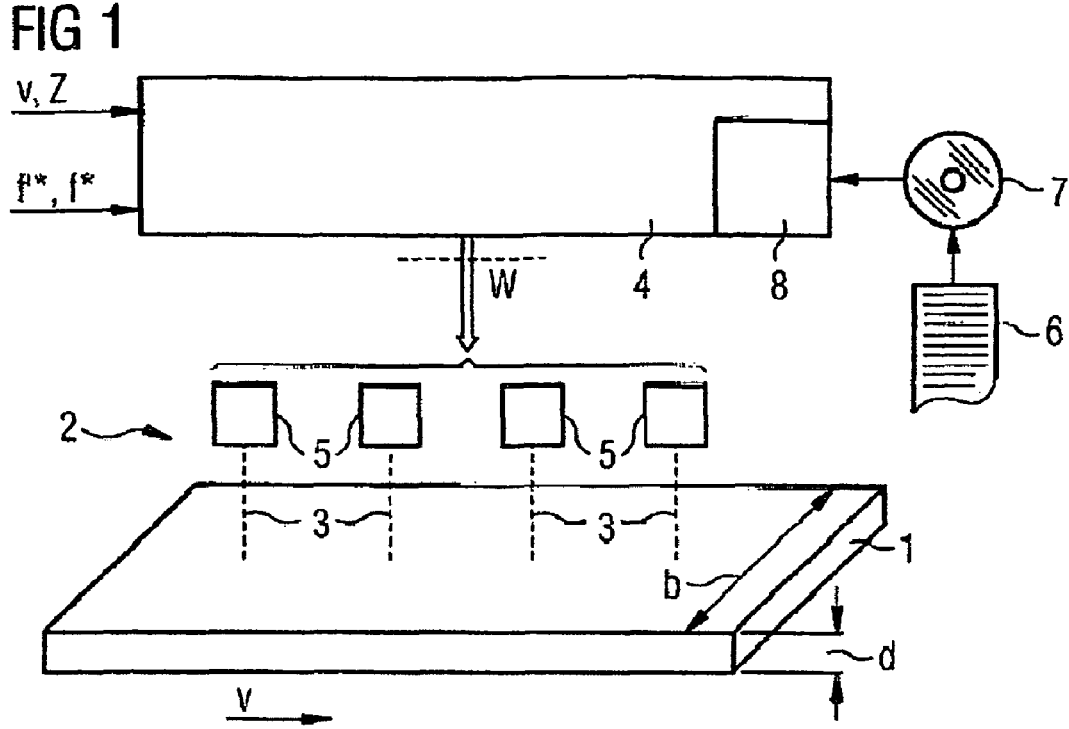

In accordance with FIG. 1 a steel band 1 for example is to be cooled off so that it assumes specified final properties. To this end the steel band 1 is treated in a cooling line 2 with a cooling medium 3—as a rule water.

The steel band 1 has a breadth b and a depth d. It also has—basically any—band length. It passes through the cooling line 2 at a velocity v.

The band velocity v is continuously recorded and fed to a computer 4 which controls the cooling line 2. The computer 4 is thus able in a known way to implement a path trace of the steel band 1. The zones of the steel band 1 which are affected are also known to the computer 4 if the cooling medium 3 is applied to the steel band 1 by means of delivery devices 5 of the cooling line 2.

The computer 4 is programmed with a computer program 6 which is supplied to the computer 4 via a data medium 7, e.g. a CD-ROM 7. The computer program 6 is stored in (exclusively) machine-readable form on the data medium 7. The computer program 6 is accepted by the computer 4 and stored in bulk storage 8, e.g. on a hard disk 8, of the computer 4. This enables the computer 4, when the computer program 6 is called, to execute a modelling method for the steel band 1 or for its individual zones (=the steel volume 1) which will be described in more detail below.

Figure 2:
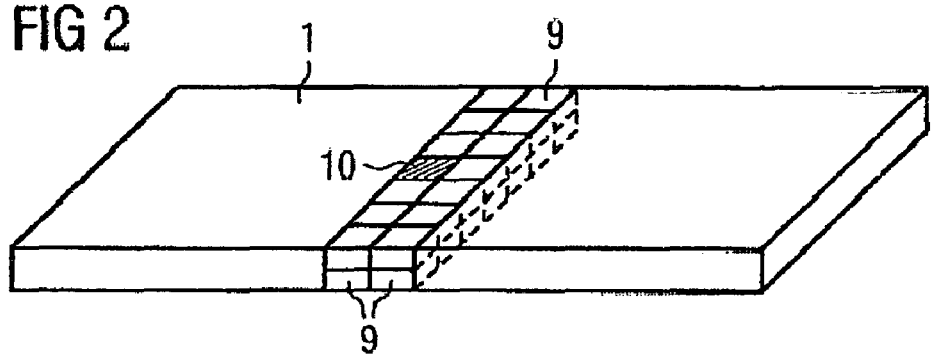

As shown in FIG. 2 the steel volume 1 is broken down within the computer 4 into volume elements 9. Where a volume element 9 is not surrounded in this case on all sides by other volume elements 9, one or two surface elements 10 are assigned to the relevant volume element 9. The surface elements 10 in their entirety form a volumetric surface of the steel band 1 or of the zone of the steel band 1 observed.

Figure 3:
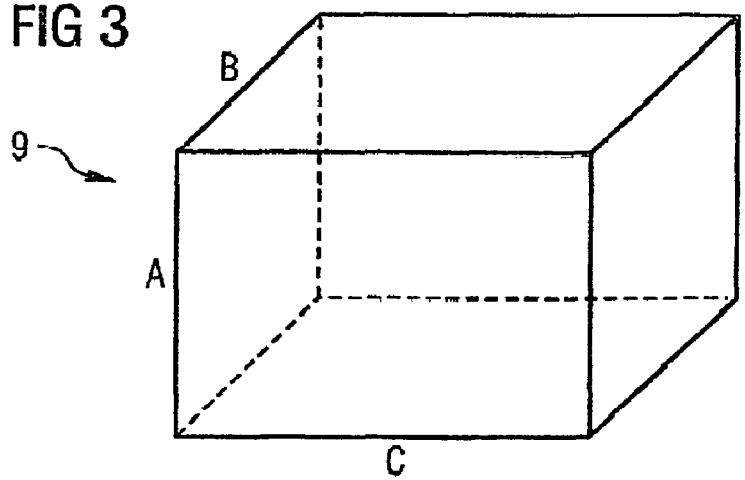

On the basis of the programming with the computer program 6 the computer 4 especially implements a mode in which for each volume element 9 the thermal couplings with its environment are taken into account. Each volume element 9 in this case—see FIG. 3—is embodied in the shape of a cube It thus has three basic dimensions A, B, C which as a rule are oriented in parallel to the direction of the band velocity v, the band breadth b and the band depth d.

Figure 4:
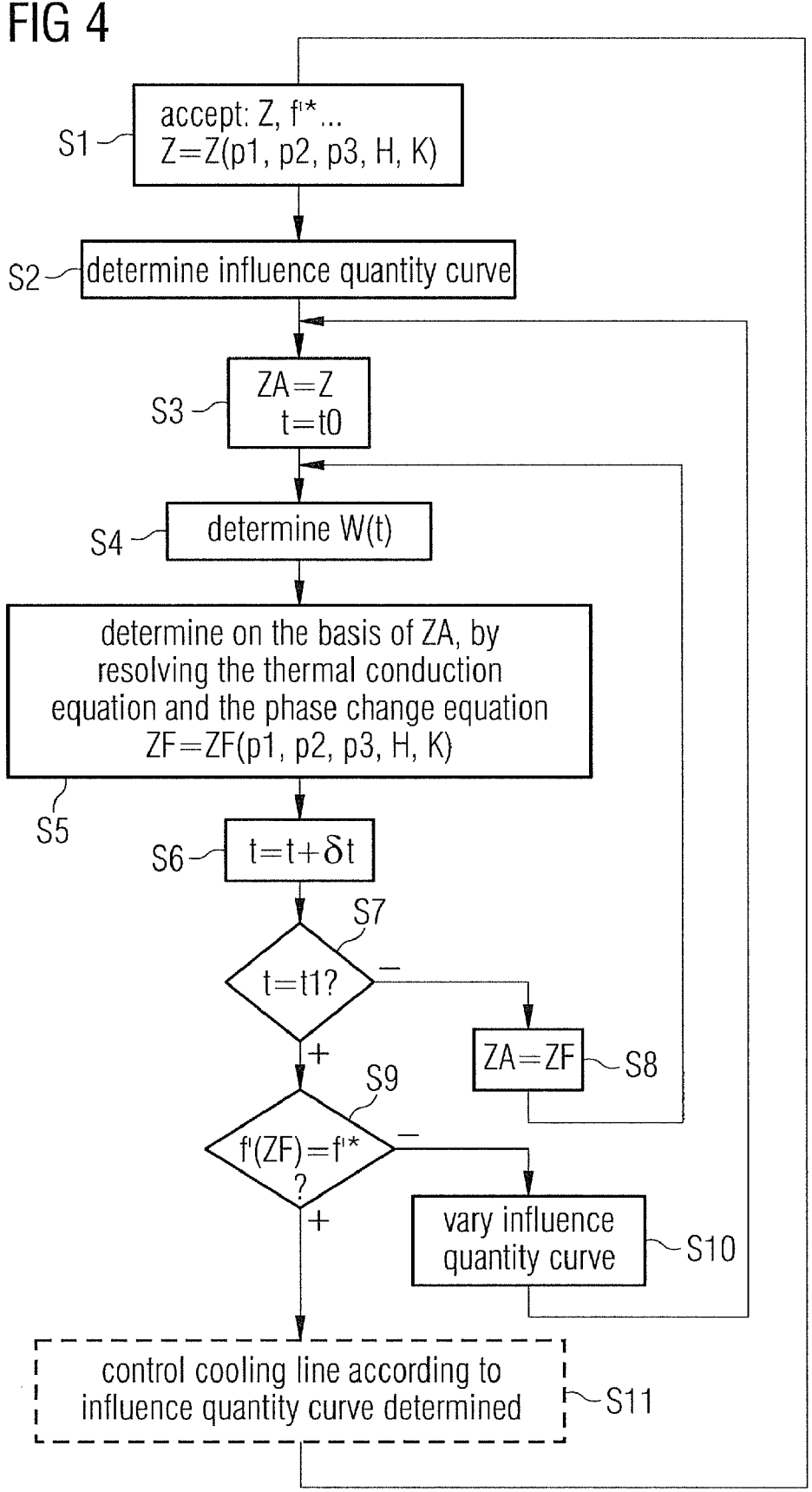

In a first embodiment of the inventive modelling method the computer 4 is supplied in accordance with FIG. 4 in a step S1 with a first state Z. The first Z comprises for each volume element 9 of the steel band 1 initially local proportions p1, p2, p3 of modelled phases of the steel. The phases can especially be ferrite (proportion p1), cementite (proportion p2) and austenite (proportion p3).

The first state Z also comprises for each volume element 9 of the steel band 1 a quantity H which describes the local energy content of the steel of the volume element 9. For example this quantity H can be the enthalpy H of the volume element 9. Alternatively the temperature or the entropy are also considered.

Finally the first state Z, for at least one of the volume elements 9 of the steel band 1, preferably for each volume element 9 of the steel band, also comprises a local distribution in concentration K of at least one mobile alloy element in the steel. The mobile alloy element can in particular be carbon. Nitrogen can also be considered for example as a alternative or in addition.

As part of step S1 the computer 4 is further supplied with at least a desired end value f*. If necessary the computer 4 can also be supplied as part of step S1 with intermediate quantities, so that if necessary even a desired timing curve of the quantity can be specified to the computer 4.

In accordance with FIG. 4 an influence quantity sequence is now defined in a step S2. The influence quantities sequence comprises an influence quantity W for a plurality of directly consecutive points in time. The influence quantity W corresponds for example to the volume of coolant to be applied to the steel volume 1 (i.e. the steel band or its observed zone) taking into account other influences on the steel volume such as the transport rollers, heat convection, heat radiation etc. for example. It comprises a local influence in each case for the plurality of surface elements 10 of the steel volume 1 (see FIG. 2). The local influences then operate via the relevant surface element 10 on the steel volume 1.

In accordance with FIG. 4, in a step S3 an initial state ZA of the steel volume 1 is now set equal to the first state Z and a time base t at a start time t0. The start time t0 as a rule corresponds in this case to the point in time at which the observed steel volume 1, that is a section of the steel band 1 for example enters the cooling line 2.

Then in a step S4, on the basis of the influence quantity sequence, the influence quantity to be applied at the point determined by the time base t is determined. In a step S5 the computer 4 then determines on the basis of the instantaneous initial state ZA of the steel volume 1 and of the instantaneous influence quantity W operating over the volumetric surface on the steel volume 1 a subsequent state ZF of the steel volume The computer 4 resolves a thermal conduction equation and a phase change equation in this case. The subsequent state ZF comprises these same elements K, p1, p2, p3, H as the initial state ZA.

Then in a step S6 the time base t is incremented by the time increment $\Delta t$. Next, in a step S7 a check is made as to whether the time base t has reached an end time t1. The end time t1 in this case generally corresponds to the time at which the observed steel volume 1 leaves the cooling line 2 again.

If end time t1 is not yet reached, in a step S8 the initial state ZA is set equal to the subsequent state ZF determined immediately beforehand and then a branch is made back to step S4.

If on the other hand the end time t1 was reached, the program exits from the loop consisting of steps S4 to S8. If no further measures are taken thereafter, only a so-called process observer is realized. Preferably however, as shown in FIG. 4, an expected final value f', e.g. the temperature or the material hardness is determined in a step S9 on the basis of the subsequent state ZA now determines and is compared to the desired final quantity f*. If the expected final quantity f' does not correspond to the desired final quantity f*—provided the corresponding computing power is available—the sequence of the influence quantities W is varied in a step S10. A branch is then made back to a step S3. Otherwise the required coolant amount sequence is determined so that the computer 4 can now accordingly control the cooling line 2 in a step S11.

For the sake of completeness it should be mentioned here that the computer 4, if as well as the desired end quantity f*, desired intermediate quantities are also specified to it, obviously determines the coolant sequence up to the first desired intermediate quantity, then up to the second desired intermediate quantity etc., until the entire coolant amount sequence up to the desired end quantity f* is determined.

In accordance with FIG. 1 and 4 the model method described above is executed online and in real time. An offline execution is obviously easily possible too. This is indicated in FIG. 1 by the fact that the connection of the cooling line 2 to the computer 4 is shown as an openable connection, that is there does not have to be a direct control of the cooling line 2. Furthermore step S11 in FIG. 4 is only shown by dashed lines.

The procedure in accordance with FIG. 4 demands a very great computing effort. If the computing power required for execution of the method in accordance with FIG. 4 is not available, but online control using the inventive modelling method is still to be undertaken, a method is executed online and in real time which is described below in greater detail in conjunction with FIG. 5.

Figure 5:
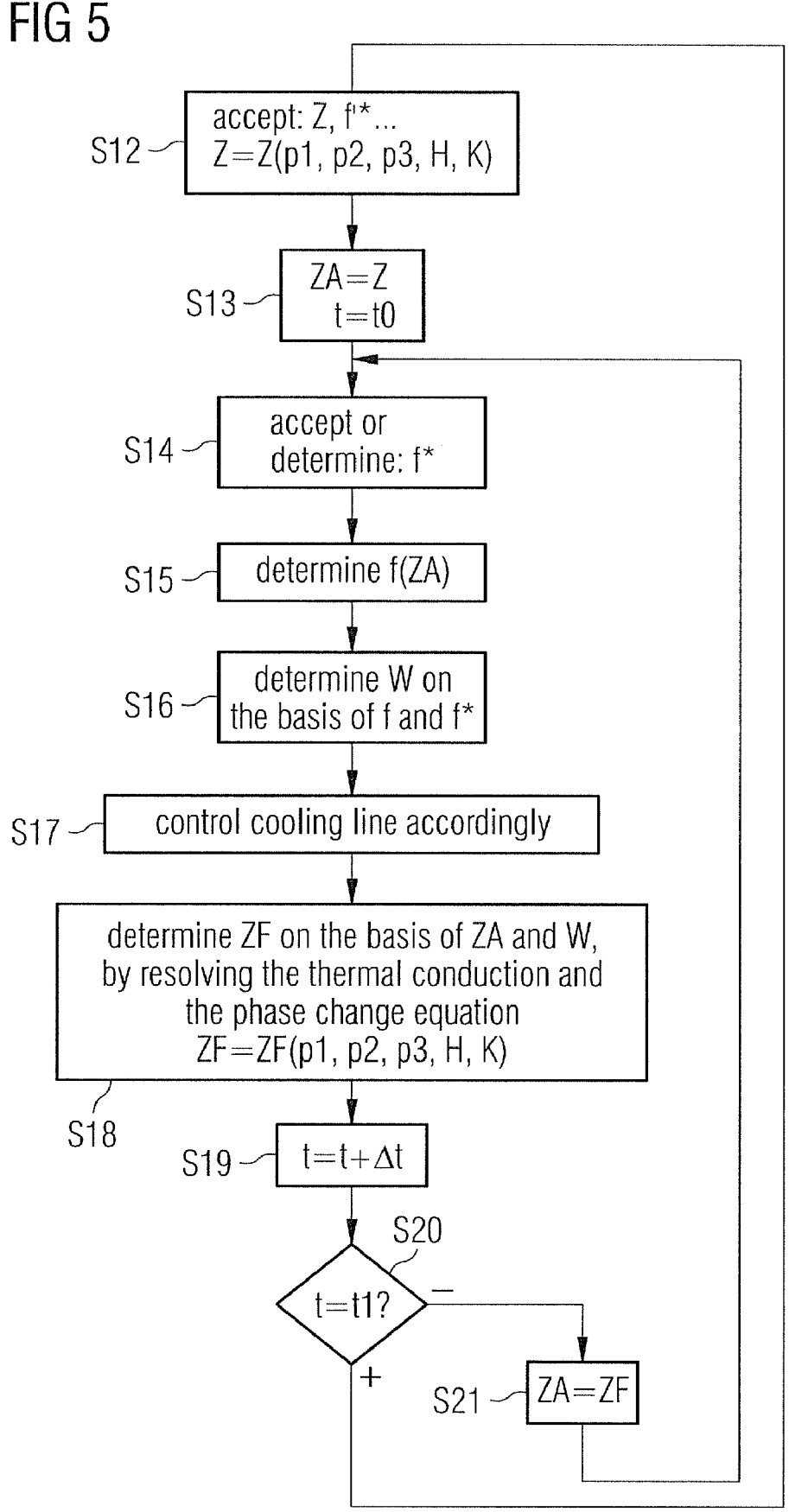

In accordance with FIG. 5 the computer 4 accepts the first state Z in a step S12 similar to step S1. In a step S13 similar to step S3 the computer 4 sets the initial state ZA equal to the first state Z and the time base t to time t0. Then the computer 4 in a step S14 determines a desired subsequent quantity f* or accepts this quantity.

In a step S15 similar to step S9 the computer 4 determines an initial quantity t on the basis of an initial state ZA. On the basis of the initial quantity f and the desired subsequent quantity f* determined in step S15, the computer 4 then determines the influence quantities W in a step S16. In a step S17, which corresponds to the step S11, the computer 4 finally controls the cooling line 2 in accordance with the influence quantity W determined. In this case the control is preferably undertaken immediately, as in FIG. 5. If necessary however an activation can also be undertaken in the next cycle.

The subsequent steps S18 to S21 correspond to the steps S5 to S8 of FIG. 4. A detailed description of these steps S18 to S21 is thus dispensed with.

The method in accordance with FIG. 5a is preferably used for example for a control of a steel band 1 running through the cooling line 1 for expiry of the desired subsequent quantity f*. In this case the method described above in connection with FIG. 5 must obviously be executed individually for each individual section of the steel band 1. Also for each section those of the supply devices 5 must be activated in the area of influence of which the observed section is currently located. This is guaranteed by the path tracing mentioned at the start. The method in accordance with FIG. 5 is in this case furthermore executed in parallel for all the sections of the steel band 1 located in the cooling line 2.

The desired subsequent quantity f* in each case can be explicitly specified to the computer 4. It is however also possible for the computer merely to have the desired subsequent quantity f* specified to it, e.g. on exit of the steel band 1 from the cooling line 2 or on reaching a coiler on which the steel band 1 is coiled. In this case the computer 4 determines independently on the basis of a pre-specified determination specification the desired subsequent quantities f* for the individual iterations.

The controlling in accordance with FIG. 5 can of course also be structured in a different manner, as is described in the older DE 103 21 792.4 for example.

As mentioned in the steps S5 and S18 a thermal conduction equation and a phase change equation are resolved.

An example of a thermal conduction equation and of a phase change equation are shown in FIG. 6. A one-dimensional approach for thermal conduction is adopted there. For bands however this approach can in every likelihood also be simplified to the one-dimensional approach depicted in FIG. 7, since the heat flow in the longitudinal band direction and the transverse band direction is negligible. $\delta/\delta x$ is in this case the local derivation in the band breadth direction.

Figure 8:
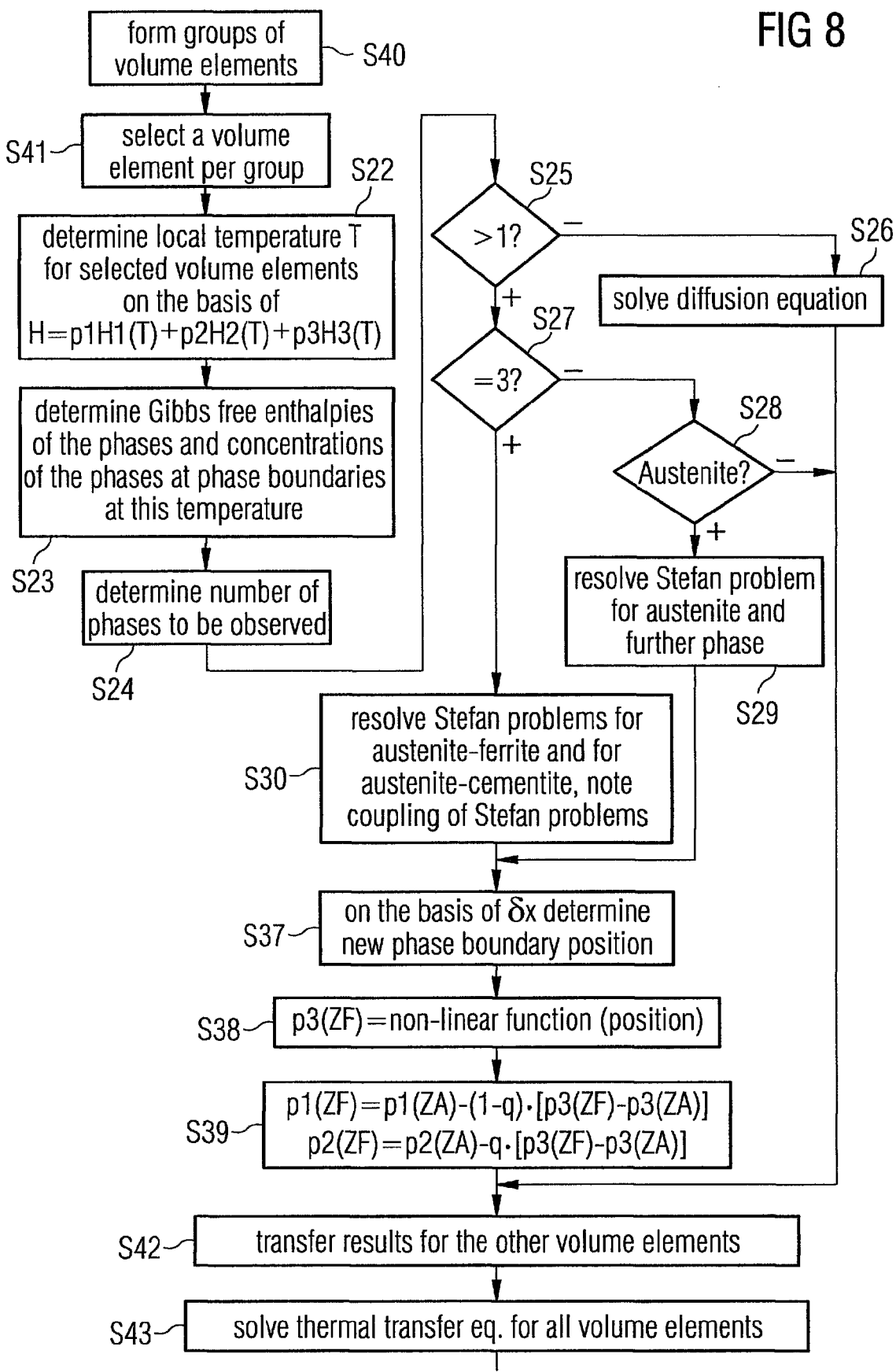

The thermal conduction equation and the phase change equation are evidently coupled to one another. To resolve the thermal conduction equation and the phase change equation (step S5, S18) the procedure in accordance with FIG. 8 is thus as follows:

The local temperature T is first determined in a step S22. The temperature is determined on the basis of the enthalpy H and the proportions p1, p2, p3 of the phases ferrite, cementite and austenite. Because of the small size of the observed volume element 9 it can namely be assumed that the local temperature T is constant within the volume element 9. This means that the phases of the steel within this volume element 9 also exhibit this same local temperature T. The enthalpy H of the volume element 9 can thus be written as i. $H=p1H1(T)+p2H2(T)+p3H3(T)$ (1)

Since furthermore for each of the phases of the enthalpies H1, H2 or H3 the relevant phase as function of the local temperature T—where necessary for austenite taking into consideration the proportion of carbon—are uniquely determined, the local temperature T is able to be easily determined by the equation 1.

Figure 9:
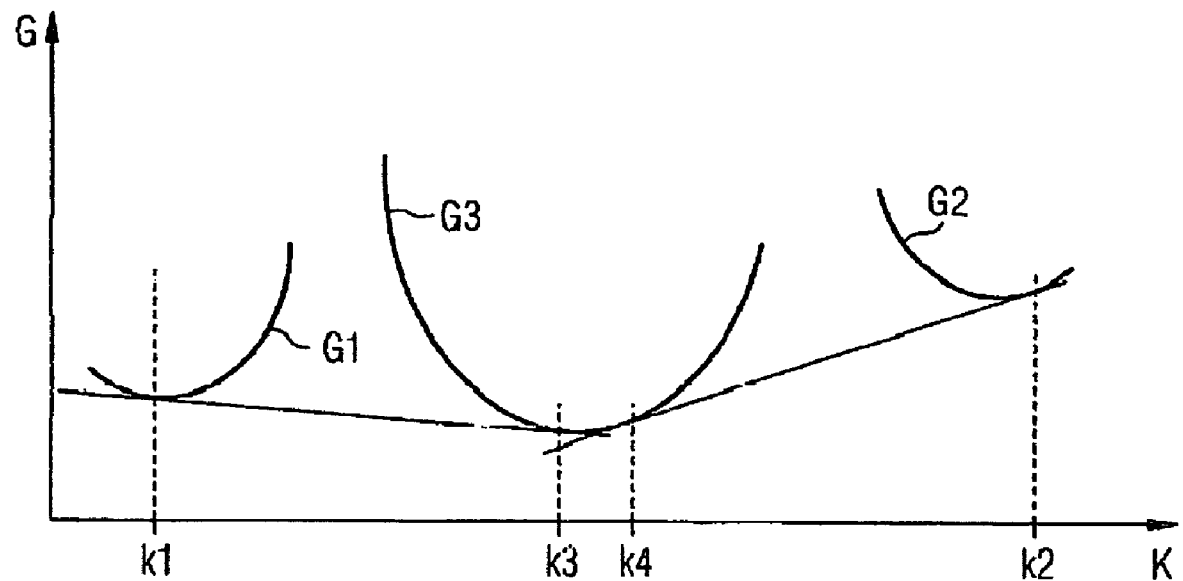
Figure 10:
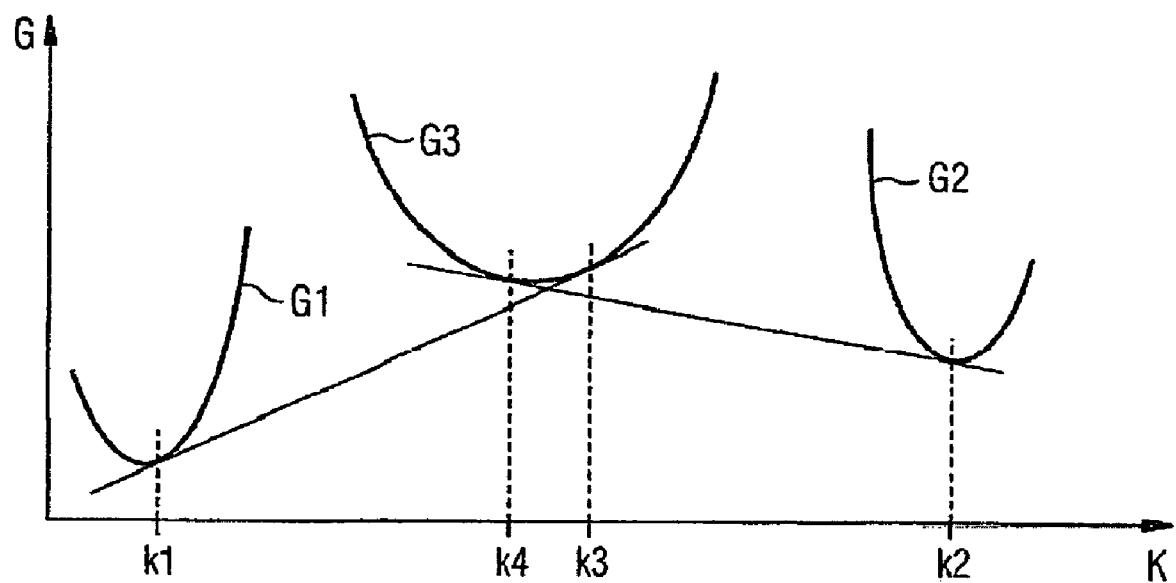

For the local temperature T determined in the step S22 the Gibbs free enthalpies G1 to G3 of the individual phases are then determined in a step S23—separately for the phase ferrite, cementite and austenite—as a function of the proportion of the mobile alloy element. Examples of these types of curve are shown in FIGS. 9 and 10. In the example depicted in FIG. 9 the local temperature T in this case lies above the temperature at which austenite changes into perlite, in the example depicted in FIG. 10 it lies below this temperature.

It is possible to always assume that all three phases ferrite, cementite and austenite are present and only later—see the explanations for FIG. 18 below—to decide which phases are present and which phase changes are taking place. In accordance with FIG. 8 however the number of phases to be observed is initially determined in a step S24. This is done using the following procedure:

Initially the system ferrite-austenite is extracted. A check is made for this system whether the overall proportion of the mobile alloy element present in the volume element 9 is purely ferritic, purely austenitic or mixed stable and which phase distribution is present in the stable state where necessary. The overall proportion of the mobile alloy element can easily be determined on the basis of the concentration in distribution.

The stable phase(s) is (are) determined and if necessary distributed by an attempt being made to determine a minimum for the total Gibbs free enthalpy G of such a system. The concrete procedure is produced in this case as described on pages 16 to 18 of the older German Patent Application 102 51 716.9. This procedure simultaneously also delivers concentrations K1 and K3 in which the mobile alloy element—a typically carbon—is present at any phase boundary 11 between ferrite and austenite in the ferritic or the austenitic zone.

The mixture systems ferrite-cementite (=perlite) and austenite-cementite are then investigated in a similar manner. The investigation of the mixture system austenite-cementite simultaneously also delivers concentrations K2 and K4 in this case in which the mobile alloy element is present at any phase boundary 12 between cementite and austenite in the cementitic or the austenitic zone.

The three Gibbs free enthalpies G determined for the three two-phase systems are compared to one another and the two-phase system with the overall minimum Gibbs free enthalpy G is obtained. If this two-phase system contains austenite, it is possible to determine on the basis of the Gibbs free enthalpies whether the stable state comprises one or two phases, which phase this might necessarily be or which phases these might necessarily be and which concentrations k1, k3 or. k2, k4 of the mobile alloy element are present on both sides of the phase boundary 11 from austenite to ferrite or the phase boundary 12 from austenite to cementite in each case.

It is further known from initial state ZA which phases are initially present for which proportions p1 to p3.

If the two-phase system with the minimum Gibbs enthalpy G contains austenite, it can thus be determined by looking at the initially present phases and the phases determined as stable where they are a pure system with only one of the phases ferrite, austenite and cementite or a mixed system with two or even three of the phases ferrite, austenite and cementite have to be observed. Because of the fact that it can also be determined on the basis of the Gibbs free enthalpies G, G1 which phase is stable or which phases are stable in addition the direction of any phase change is also known.

If the two-phase system with the total minimum Gibbs free enthalpy G is the perlite system and the initial state ZA does not contain any austenite (p3=0), a completely changed framework, that is a two=phase system ferrite-cementite is present that is not subject to any further phase change. if on the other hand the initial state ZA contains austenite (p3>0) and the perlite system features the minimum Gibbs free enthalpy G it cannot simply be decided whether one or both of the phases ferrite and cementite will now be formed. in this case it is thus provisionally assumed that both phases are formed, that is that a three-phase system ferrite-cementite-austenite is to be observed.

A next check is made in a step S25 as to whether there is more than one phase present in the observed volume element 9. If this is not the case, there is obviously no phase change. Despite this, in a step S26 a diffusion equation for the mobile alloy element is started and resolved for the volume element 9 in order to compensate for any concentration variations of the mobile alloy element within the observed volume element 9. This process is especially of significance for austenite, in which the carbon content can vary greatly. The approach and the solution of such a diffusion equation is generally known to those skilled in the art. The use of the diffusion equation and its solution will thus not be dealt with in any greater detail here.

If there is more than one phase present in the observed volume element 9, a check is made in a next step S27 as to whether all three phases are present. If they are not the system is a two-phase system. In this case a check is made in a step S28 whether one of the two phases present is austenite. If this is not the case, the system is a complete perlite system, that is a layer structure made from ferrite and cementite. This structure is essentially stable. In this case no further measures must thus be taken.

Figure 11:
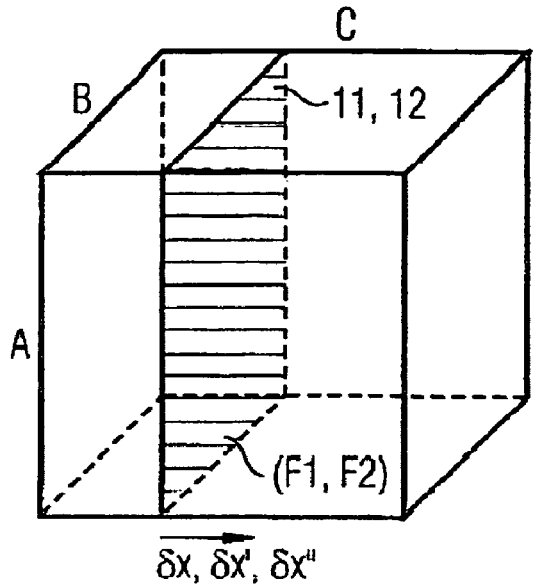
Figure 12:
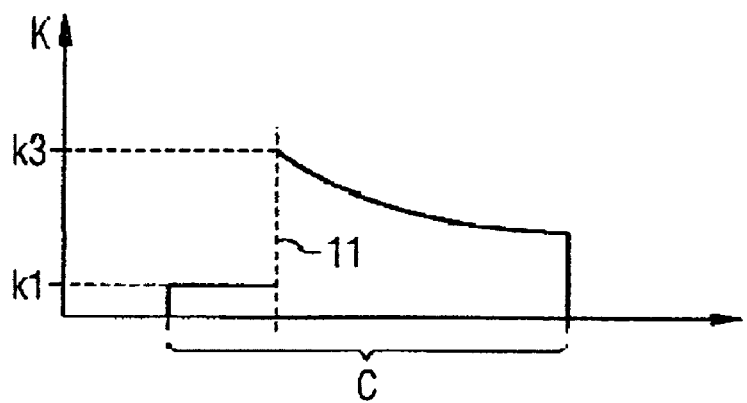
Figure 13:
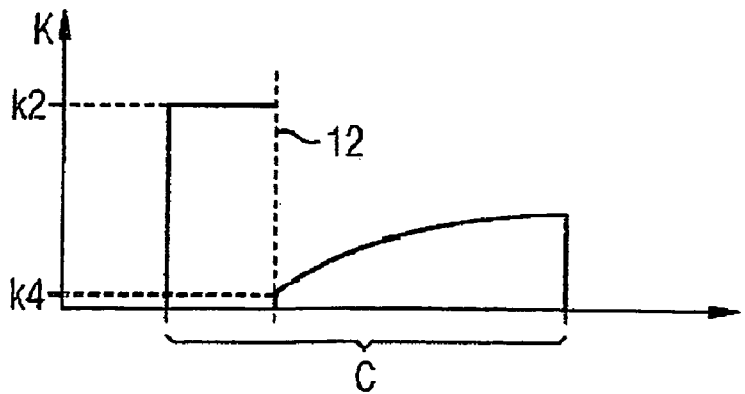

If on the other hand one of the phases is austenite and thus the other phase is ferrite or cementite, a phase boundary 11 exists between austenite and ferrite (see FIGS. 11 and 12) or a phase boundary 12 between austenite and cementite (see FIGS. 11 and 13). In this case it is assumed as a simplifying measure that the phase boundary 11 or 12 is embodied as a rectangle which has a longitudinal side and a transverse side. The longitudinal side and the transverse side of the rectangle correspond in this case to the basic dimensions A and B of the observed volume element 9. Displacements of the phase boundary 11, 12 occur in this case, as is especially evident from FIG. 11, in parallel to basic dimension C.

As is generally known to those skilled in the art, and can also be seen from FIG. 12, only very little carbon is contained in ferrite. By contrast, at the phase boundary 11 to the austenitic zone there is a jump in concentration. The concentrations k1, k3, in which the mobile alloy element is present at the phase boundary 11 are in this case the concentrations k1, k3, which were determined above in the step S24 for the ferrite-austenite system.

If, as shown in FIG. 12, a change is to take place from austenite into ferrite, the "concentration peak" of the mobile alloy element must diffuse down in the austenitic zone in the vicinity of the phase boundary 11. Conversely, if a change is to occur from ferrite into austenite, the "concentration trough" of the mobile alloy element in the austenitic zone in the vicinity of the phase boundary 11 must be constantly filled up. The numerical or analytical solution to this task is generally known as the Stefan problem. It is undertaken in a step S29. In the present case the Stefan problem can be formulated as follows:

$$i.\ K'_t - DK'_{xx} = 0 \quad (2)$$

D is in this case the—where necessary temperature-dependent—diffusion constant of the mobile alloy element in the austenite. K' is the concentration K. The indices t and x mean the derivation according to the time or the location in the direction of displacement of the phase boundary 11. The displacement direction of the phase boundary 11 in this case does not necessarily have to be the band breadth direction.

The initial conditions for the equation 2 are defined by the local distribution in concentration K' of the mobile alloy element in the initial state ZA. For resolution of the Stefan problem only the peripheral conditions then have to be considered, that in the ferritic or austenitic zone at the phase boundary 11 the concentrations k1 or. k3 are present, that the mobile alloy element cannot leave the volume element 9 concerned and that the displacement δx' of the phase boundary 11 in accordance with the Stefan condition produces $$i.\ (k3-k1)\delta x'/\delta t=-DK'_x, \tag{3}$$

with δt being the timing step sizes used in the resolution of the Stefan problem. In this case this can be a fraction (½, ⅓, ¼ . . .) of the time step width Δt or equal to the time step width Δt.

By resolving the Stefan problem in the step S29 it is also determined whether and how the distribution in concentration K or. K' of the mobile alloy element changes in the austenitic zone of the volume element 9 observed. At the same time it is also determined in this case, whether and by what extent δx' the phase boundary 11 is displaced thereby.

If the further phase is not ferrite, but cementite is, basically the same type of approach to the solution is produced and also basically a solution of the same type. The difference is only that for the formation of cementite carbon is greatly enriched in the cementite and in the austenitic zone in the vicinity of the phase boundary 12 carbon is degraded from the cementite. This too is generally known to persons skilled in the art and is shown in FIG. 13. The peripheral conditions thus change. The displacement δx" of the phase boundary 11 in accordance with the Stefan condition in this case is produced for $$i.\ (k4-k2)\delta x''/\delta t=-DK''_x, \tag{4}$$

K" is in this case again the concentration K.

Figure 15:
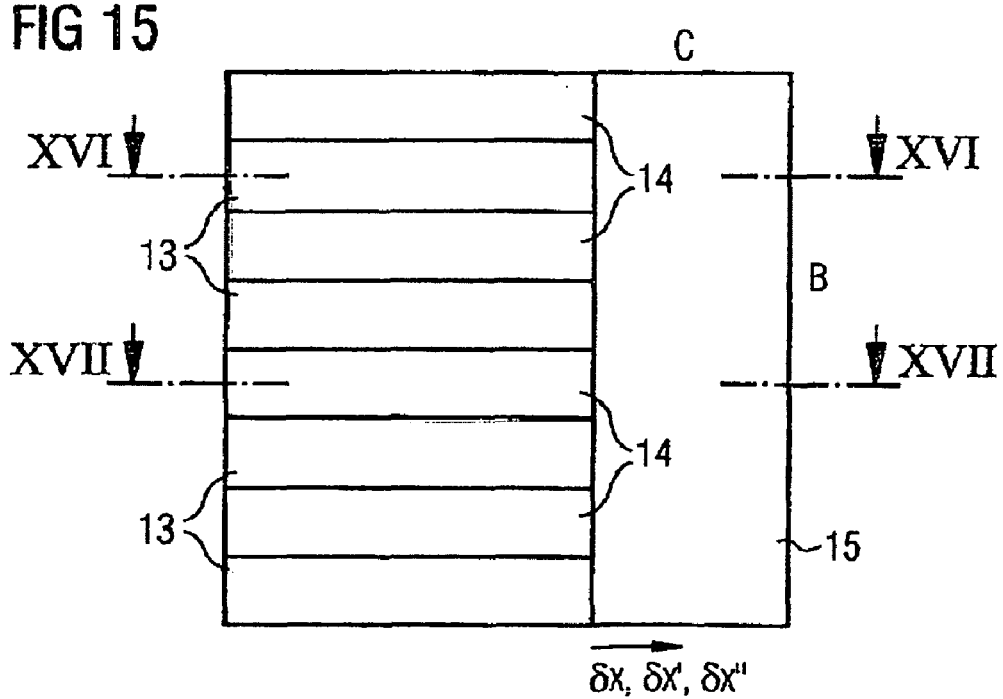
Figure 16:
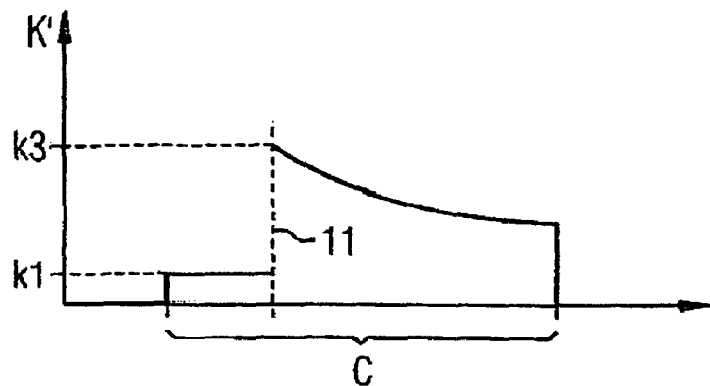
Figure 17:
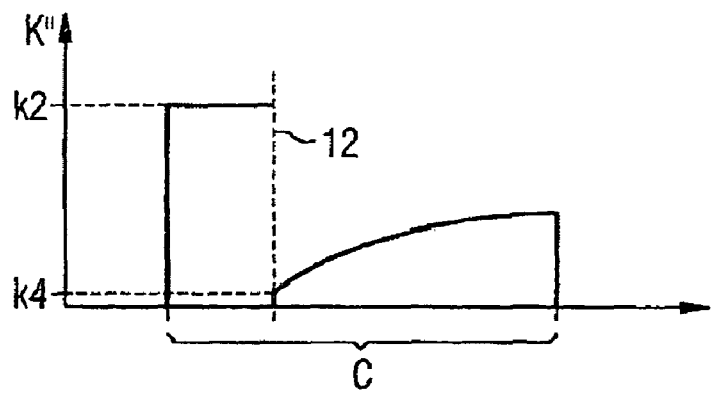

If on the other hand in the step S28 it was established that all three phases are present or could be present, a more complicated problem is produced. The approach which must then be selected is that a layer structure exists, which—see FIGS. 14 and 15—consists of an alternate ferrite layer 13 and a cementite layer 14. The layer structure borders an austenitic zone 15. FIGS. 16 and 17 each show a curve of the concentration K' or. K" of the mobile alloy element in a ferrite layer 13 or a cementite layer t 14 and in the austenitic zone 15 in front of these layers 13, 14.

Within the framework of the model it is still assumed in this case, that the phase boundaries 11, 12 are embodied as rectangles each having a longitudinal side and a transverse side. The longitudinal sides continue to correspond to the first basic measurement A. The transverse sides still run in parallel to the second basic dimension B. It is also still assumed that displacements of the phase boundaries 11, 12 occur in parallel to the third basic dimension C.

For each of the phase boundaries 11 and 12 a Stefan problem is now formulated and resolved in a step S30. The step S30 is shown in greater detail in FIG. 18.

Figure 18:
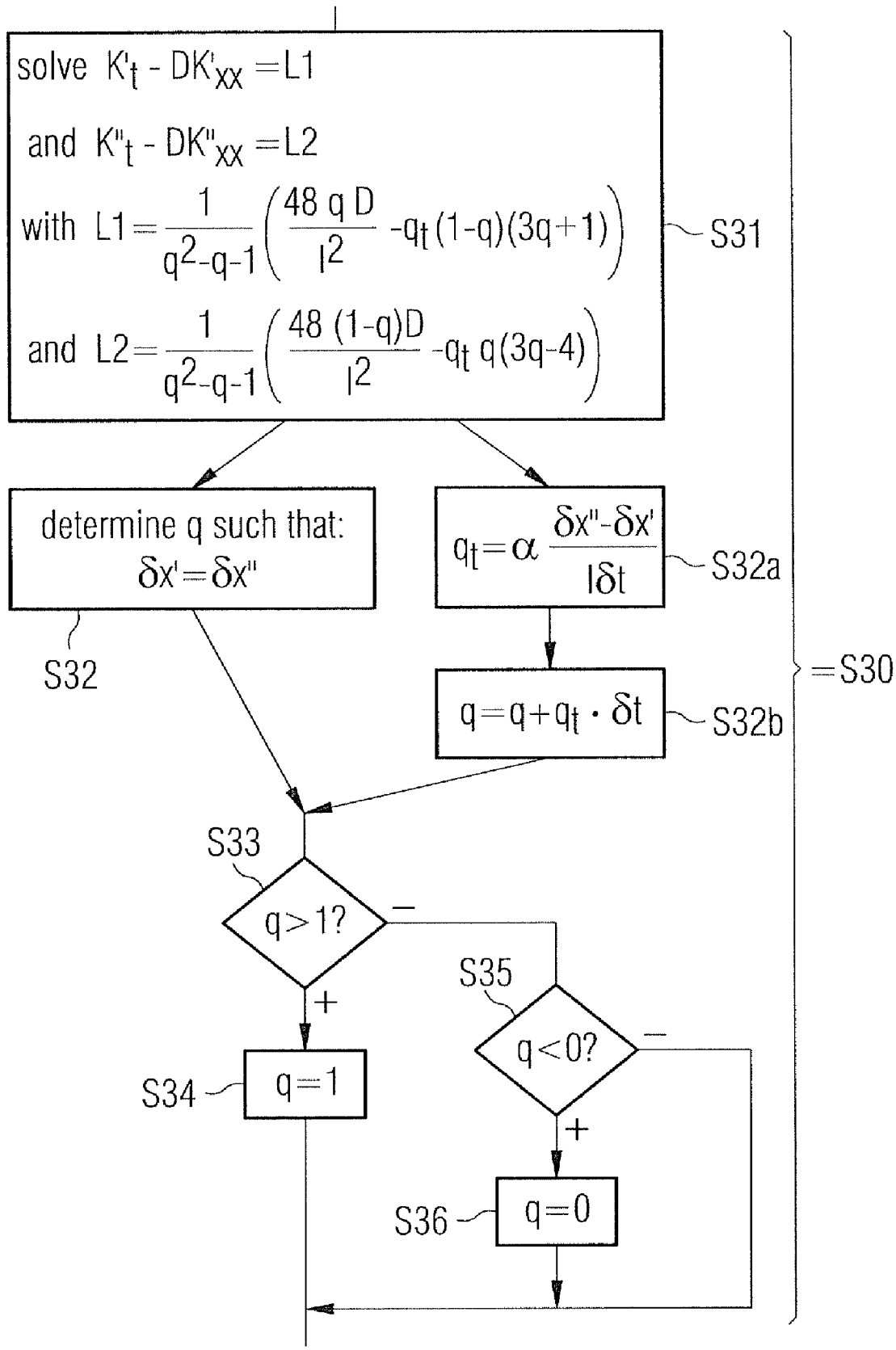

The Stefan problem for the phase boundary 11 between ferrite and austenite obeys in accordance with FIG. 18, see step S31 there, the following law:

$$i.\ K'_t-DK'_{xx}=L1 \tag{5}$$

K' is in this case the concentration of the mobile alloy element before the phase boundary 11.

The Stefan problem for the phase boundary 12 between cementite and austenite obeys the following law:

$$i.\ K''_t-DK''_{xx}=L2 \tag{6}$$

K" in this case—like K'—is the concentration of the mobile alloy element before the phase boundary 12.

L1 and L2 are coupling terms. They are—see FIG. 14—functions of a lamella spacing l of the layer structure and of a proportion q of the cementite phase at the layer structure as well as its time derivation. Written out they can for example be as follows:

$$\gamma L1 = \frac{1}{q^2-q-1}\left(\frac{48qD}{l^2}-q_t(1-q)(3q+1)\right) \tag{7}$$

and $$\gamma L2 = \frac{1}{q^2-q-1}\left(\frac{48(1-q)D}{l^2}-q_t q(3q-4)\right) \tag{8}$$

As can be seen from the equations 5 to 8, the two Stefan problems are coupled to each other because of the coupling terms L1, L2 on the right side of the equations 5 and 6.

In the equations 5 to 8 as well the indices t and x again stand for the derivation in accordance with the time or the location in the direction of displacement of the phase boundary 11 or 12.

The Stefan conditions continue to apply for the displacements δx', δx" of the phase boundaries 11, 12 (see equations 3 and 4). It is thus possible to set the displacements δx', δx" equal in accordance with the equations 3 and 4 in a step S32. The proportion q is then to be determined such that the displacement δx' of the phase boundary 11 in accordance with equation 3 and the displacement δx" of the phase boundary 12 in accordance with equation 4 assume the same value. The proportion q in this case is also to be defined such that the phase boundaries 11, 12 always remain arranged next to one another.

The equivalence of the displacements δx', δx" of the phase boundaries 11, 12 can also be obtained by the proportion q of the cementite phase in the layer structure of the perlite being suitably selected. One can also determine—e.g. by trial and error, for which proportion q of the cementite phase the displacements δx', δx" of the phase boundaries 11, 12 match.

On the basis of the proportion q thus determined it can also then be determined, whether perlite will actually be formed or whether only one of the two phases ferrite and cementite will be formed. Perlite will only be formed if the proportion q lies between zero and one. If the proportion q on the other hand is greater than one, exclusively cementite is formed. If on the other hand it is less than zero, exclusively ferrite is formed.

The proportion q can with the procedure assume any values for numeric reasons, that is especially also less than zero or greater than one. These values however make no sense physically. The proportion q is thus corrected accordingly in steps S33 to S36 where necessary.

The procedure according to step 32 can lead to numerical problems. Alternatively it is thus possible to allow differing displacements δx', δx". In this case the proportion q of the cementite in the layer structure in accordance with $$\gamma q_1 = \alpha \frac{\delta x''-\delta x'}{l\delta x} \tag{9}$$

is adjusted in steps S32a and S32b so that the positions of the phase boundaries 11, 12 tend towards one another. The steps S32a and S32b are executed in this case in accordance with FIG. 18 instead of step S32. α is a suitable proportionality constant. Its value is greater than zero.

In this case an average displacement δx the phase boundaries 11, 12 for $$\delta x = (1-q)\delta x' + q\delta x \quad (10)$$

is defined.

Regardless of which of these two procedures (step S32 or steps S32a, S32b) is followed, in both case however it is only determined and deduced from the determination of the proportion q which phases will be formed in what volume.

Figure 19:
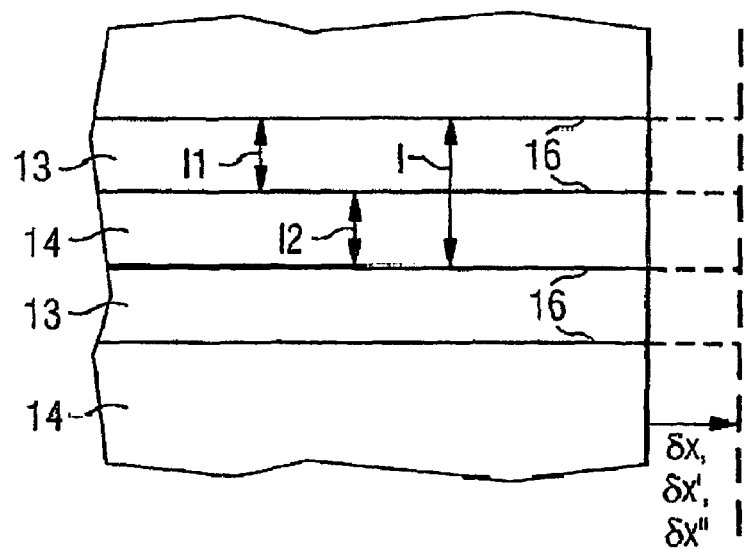

If perlite will be formed proportion q thus lies between zero and one, the lamella spacing 1 must still be determined. This is done in accordance with FIG. 19 as follows:

With the displacement δx the phase boundaries 11, 12 and the proportion q it is known which phase changes take place and in which proportions they take place. The phase changes deliver an amount δE1 for energy balance. The amount δE1 depends on the volume in which the phase changes occur. The following thus applies $$\delta E1 = \beta A1 \delta x \quad (11)$$

β is in this case a proportionality constant that can be determined in advance.

This further produces a change of the surface of a boundary layer 16 between ferrite and cementite. The change of this surface also delivers an amount δE2 for energy balance. This amount δE2 is proportional to the change in the surface of the boundary layer 16. The following thus applies $$\delta E2 = 2\gamma A \delta x \quad (12)$$

γ is in this case again a proportionality constant that can be determined in advance. The factor 2 is produced by the fact that, for each phase boundary 11, 12 or for each layer 13, 14 one boundary layer 16 respectively is present and two phase boundaries 11, 12 or two layers 13, 14 are observed.

On the basis of the equations 11 and 12 it is thus possible to determine a critical lamella spacing 1', in which the energy balance, which takes account of the two amounts δE1 and δE2 is balanced. The following then applies for this critical lamella spacing 1'

$$1' = 2\gamma/\beta \quad (13)$$

The lamella spacing 1, that is the sum of the layer thicknesses 11 and 12, is now set to appr. one and a half times to three times this critical lamella spacing 1', e.g. to appr. twice The layer thicknesses 11 or 12 are then produced for $$L1 = (1-q)1 \text{ and} \quad (14)$$

$$L2 = q1 \quad (15)$$

Figure 14:
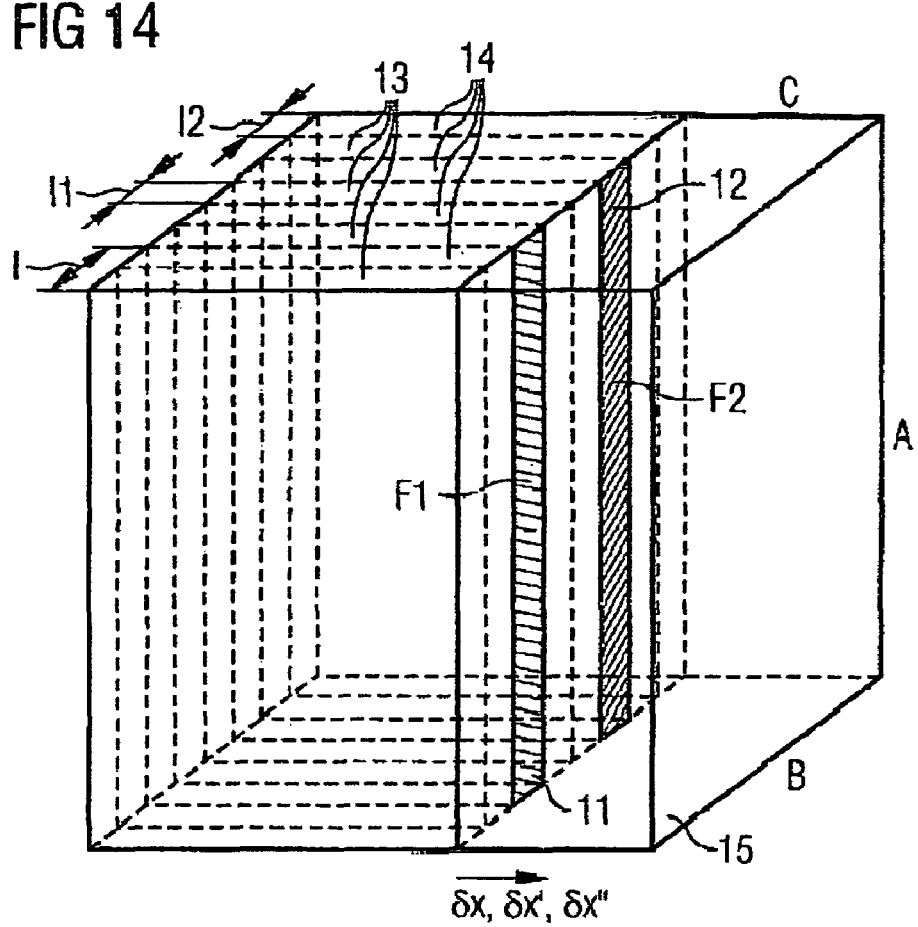

The layer thicknesses 11, 12 are proportional to square measures F1, F2, which the phase boundaries 11, 12 exhibit. Each one of the square measures F1, F2 in FIG. 14 is highlighted accordingly by shading.

If in one of the steps S29, S30 a displacement δx', δx'' of a phase boundary 11, 12, was determined, the position of the phase boundary 12 has thus changed. I this case in a step S37 (obviously taking account of the leading sign of the average displacement 6x) a new position of the phase boundaries 11, 12 or 11 and 12 is determined. In a step S38, on the basis of a non-linear function the position of the phase boundary 11, 12 or the phase boundaries 11, 12 of the proportion p3 of the austenite is determined. The non-linear function in this case especially takes account of the fact that the Stefan problem of the step S29 or the Stefan problem of the step S30 were started and resolved one-dimensionally but in reality a three-dimensional change occurs.

In a step S39 the changes of the proportions p1, p2 of the two other phases ferrite and cementite will then be determined. If in this case the steps S37 to S39 are reached from step S29, the proportion q is obviously one or zero.

With the average displacement δx of the phase boundaries 11, 12 and the proportion q of the cementite in the layer structure (0<q<1) it can thus be determined in a simple manner which changes are produced for the proportions p1, p2, p3 of the phases of the steel as regards the volume element 9 observed.

Despite the simplifying assumptions of the above modeling methods a significant computing effort is produced. Thus in accordance with FIG. 8 before step S22 steps S40 and S41 and after step S39 a step S42 are inserted.

In the step S40 the volume element 9 is assembled into groups. For example there can be a grouping together of a number of volume elements 9 which in the direction of the band breadth b, the band depth d and/or the band velocity v adjoin each other. Combinations of these are also possible. In the step S41 a single one of the volume elements 9 in each case is then selected per group of volume elements 9. Only for the selected elements of the volume elements 9 are in steps S22 to S39 the differential equation, the Stefan problem or the Stefan problems resolved and the proportions p1 p2, p3 of the phases computed.

In accordance with FIG. 8, for each group the solution result of the volume element 9 observed is accepted in the step S42 for the other volume elements 9 of the relevant group. This represents the simplest procedure. It would however also be conceivable to determine the proportions p1, p2, p3 of the phases of volume elements 9, for which the phase distribution has not been explicitly computed through linear or non-linear interpolation.

Because of the circumstance, namely that for each group of volume elements 9 only the distribution in concentration K of one of the volume elements 9 is calculated and for the resolution of the thermal conduction equation not the concentration in distribution K, but only the proportions p1, p2, p3 of the available phases are needed if necessary the concentration in distribution K can only be specified for this one volume element 9 of each group.

The thermal conduction equation on the other hand is resolved in a step S43 individually for each of the volume elements 9. The step S43 can in this case alternatively be executed before or after the resolution of the phase change equation in the steps S22 to S42.

The resolution of the thermal conduction equation is possible in any event. This is because the temperatures T of the individual volume elements 9—see above explanations for step S22—can be determined in any event, so that their location gradient can also be determined immediately. Since the proportions p1, p2, p3 of the phases of the individual volume elements 9 are also known, the thermal conductivity λ of the individual volume elements 9 can also be easily determined. Since finally the density p is essentially a constant and the enthalpy H of the individual volume elements 9 is given directly the thermal conduction equation is thus also soluble as a whole.

Using the present invention a physical model is thus created in which, on the basis of the Gibbs free enthalpy G and of the diffusion law (Stefan problem) the change process as regards phase proportions p1, p2, p3 arising and speed of change can be described with very high accuracy. Generally valid results are made possible which also allow the handling of as yet unknown substances and materials. The approaches can also be used not only for temperature calculation, but also for computing the framework structure and particle size.

The inventive modelling method can be employed at any point, that is especially for example also for cooling processes between roller frames of a roller track or with so-called ferrite rollers. It is also suitable for description of the change back when the steel is heated up.

The invention claimed is:

1. A method for computer-assisted modeling behavior of a steel volume having a volumetric surface, comprising:
resolving a thermal conduction equation and a phase change equation to determine a subsequent state of the steel volume;
operating a computer based on an instantaneous initial state of the steel volume and an instantaneous influence quantity via the volumetric surface on the steel volume, wherein at least one influence quantity includes a local influence for a plurality of surface elements of the volumetric surface and the local influence operates via the plurality of surface elements on the steel volume;
identifying a local energy content of the steel volume where the initial state and the determined subsequent state for a plurality of volume elements of the steel volume comprise local proportions of modeled phases of the steel and a quantity, wherein
the modeled phases of the steel comprise austenite and a first further phase which can transform between austenite and the first further phase, and
the initial state and the determined subsequent state for at least one of the volume elements further comprise a local distribution in concentration of a mobile alloy element in the steel;
determining which concentrations of the mobile alloy element are present on both sides of a first phase boundary between austenite and the first further phase for the at least one of the volume elements based upon the phase change equation;
resolving a first Stefan problem;
determining, based on the resolution of the Stefan problem, if the distribution in concentration of the mobile alloy element changes in an austenitic zone of the at least one of the volume elements and if the first phase boundary is displaced; and
determining the local proportions of the phases based on the position of the first phase boundary defined by the extent of the displacement of the first phase boundary.

2. The method in accordance with claim 1, further comprising:
providing a second further phase which can transform between austenite and the second further phase;
determining which concentrations of the mobile alloy element are present on both sides of a second phase boundary between austenite and the second further phase for the at least one of the volume elements based upon the phase change equation; and
determining, based on a resolution of a second Stefan problem, whether and how a distribution in concentration of the mobile alloy element changes in the austenitic zone of the volume element and if the second phase boundary is displaced, wherein:
the first and second Stefan problems are coupled to each other,
square measures are assigned to the phase boundaries,
a proportion of the square measure assigned to the second phase boundary is determined from the sum of the square measures, and
the local proportions also depend on the proportion of the square measure assigned to the second phase boundary in the sum of the square measures.

3. The method in accordance with claim 2, wherein the proportion of the square measure assigned to the second phase boundary in the sum of the square measures is determined such that the phase boundaries remain arranged alongside one another.

4. The method in accordance with claim 2, wherein the proportion of the square measure assigned to the second phase boundary in the sum of the square measures is adjusted such that the phase boundaries move towards each other.

5. The method in accordance with claim 4, further comprising:
determining whether austenite is changed only into the first further phase, only into the second further phase or both into the first and into the second further phase based upon the proportion of the square measure assigned to the second phase boundary of the sum of the square measures.

6. The method in accordance with claim 5, wherein:
the volume element is a cuboid and has three cuboid basic dimensions,
the first phase boundary is a rectangle with a first longitudinal side and a first transverse side where the first longitudinal side corresponds to a first of the cuboid basic dimensions,
the first transverse side is parallel to a second of the cuboid basic dimensions, and
displacements of the first phase boundary are parallel to a third of the cuboid basic dimensions.

7. The method in accordance with claim 6, wherein:
the second phase boundary is a rectangle having a second longitudinal side and a second transverse side where the second longitudinal side corresponds to the first cuboid basic dimension,
the second transverse side extends parallel to the second cuboid basic dimension, and
displacements of the second phase boundary occur in parallel to the third cuboid basic dimension.

8. The method in accordance with claim 7, wherein the sum of the transverse sides of the phase boundaries is 1.5 to 3 times a critical lamella spacing where an energy balance considers:
the phase changes of the steel corresponding to the displacement of the phase boundaries, and
the changes in the surface of a boundary layer between the first and the second further phase corresponding to the displacement of the phase boundaries.

9. The method in accordance with claim 8, wherein the first and second Stefan problems are:
formulated and resolved in one dimension, or
the proportion of austenite is determined on the basis of a non-linear function of the location of the phase boundaries.

10. The method in accordance with claim 9, wherein the concentrations where at least one mobile alloy element is present on both sides of the first phase boundary or on both sides of the first and second phase boundary are determined on the basis of Gibbs free enthalpies of the phases.

11. The method in accordance with claim 10, further comprising: determining
whether both austenite and the first further phase are present, or
whether, in addition to austenite and the first further phase, the second further phase is also present based on the phases present in the initial state and on the basis of the Gibbs free enthalpies of the phases.

12. The method in accordance with claim 11, wherein the steel volume comprises a plurality of volume elements and the Stefan problems are resolved for a sub-portion of the volume elements and the local proportions of the phases of the remaining volume elements are determined based on the local proportions of the phases of the sub-portion of the volume elements.

13. The method in accordance with claim 12, wherein the thermal conductance equation is resolved for each volume element of the plurality of the volume elements.

14. The method in accordance with claim 1, further comprising:
specifying a first state and a desired end quantity to the computer,
applying the modeling method iteratively where the instantaneous initial state of a first iteration corresponds to the first state and subsequent initial states of further iterations correspond to the subsequent state previously determined,
determining an expected end quantity based on the subsequent state determined after a last iteration, and
comparing the expected end quantity with the desired end quantity.

15. The method in accordance with claim 14, wherein a plurality of influence quantities of the iterations correspond to an influence quantity sequence where the computer varies the influence quantity sequence based on the comparison of the expected end quantity with the desired end quantity until the expected end quantity corresponds to the desired end quantity.

16. The method in accordance with claim 15, wherein the method is executed online and in real time and within each iteration:
the computer determines the influence quantity based on an initial quantity determined from the initial state and a desired subsequent quantity and
the computer activates an influencing device where the steel volume is influenced according to the determined influence quantity.

17. A steel volume influencing system, comprising:
a digital mass storage device for storing a computer program;
a computer connected to the mass storage device for execution of the computer program where the program:
resolves a thermal conduction equation and a phase change equation to determine a subsequent state of the steel volume based on an instantaneous initial state of the steel volume and an instantaneous influence quantity via a volumetric surface on the steel volume, wherein at least one influence quantity includes a local influence for a plurality of surface elements of the volumetric surface and the local influences operate via the plurality of surface elements of the steel volume,
identifies a local energy content of the steel volume where the initial state and the determined subsequent state for a plurality of volume elements of the steel volume comprise local proportions of modeled phases of the steel and a quantity, wherein
the modeled phases of the steel comprise austenite and a first further phase which can transform between austenite and the first further phase, and
the initial state and the determined subsequent state for at least one of the volume elements further comprise a local distribution in concentration of a mobile alloy element in the steel,
determines which concentrations of the mobile alloy element are present on both sides of a first phase boundary between austenite and the first further phase for the at least one of the volume elements based upon the phase change equation,
resolves a first Stefan problem,
determines, based on the resolution of the Stefan problem, if the distribution in concentration of the mobile alloy element changes in an austenitic zone of the at least one of the volume elements and if the first phase boundary is displaced,
determines the local proportions of the phases based on the position of the first phase boundary defined by the extent of the displacement of the first phase boundary, and
determines an influence quantity based on an initial quantity determined from the initial state and a desired subsequent quantity, and
generates an influencing signal according to the determined influence quantity; and
an influencing device that receives the influencing signal from the computer and influences the temperature of the steel volume.

18. The system as claimed in claim 17, wherein the influencing device is a cooling line located within a steel production facility.

* * * * *